United States Patent
Kawashima

(10) Patent No.: US 7,313,960 B2
(45) Date of Patent: Jan. 1, 2008

(54) ULTRASONIC SENSOR ASSEMBLY

(75) Inventor: Yasuhiro Kawashima, Okazaki (JP)

(73) Assignee: DENSO CORPORATION, Kariya (JP)

( * ) Notice: Subject to any disclaimer, the term of this patent is extended or adjusted under 35 U.S.C. 154(b) by 344 days.

(21) Appl. No.: 11/194,656

(22) Filed: Aug. 2, 2005

(65) Prior Publication Data

US 2006/0022844 A1 Feb. 2, 2006

(30) Foreign Application Priority Data

Aug. 2, 2004 (JP) ............................. 2004-225829

(51) Int. Cl.
*G01S 15/93* (2006.01)
(52) U.S. Cl. .................. 73/632; 340/435; 340/693; 367/99
(58) Field of Classification Search ............. 73/632, 73/866.5; 367/99; 340/435, 693.9
See application file for complete search history.

(56) References Cited

U.S. PATENT DOCUMENTS

| | | | |
|---|---|---|---|
| 4,636,997 A * | 1/1987 | Toyama et al. ............ | 367/140 |
| 6,039,367 A * | 3/2000 | Muller et al. .............. | 293/117 |
| 6,227,501 B1 | 5/2001 | Malcolm | |
| 6,282,969 B1 | 9/2001 | Daniel | |
| 6,318,774 B1 | 11/2001 | Karr et al. | |
| 6,759,950 B2 | 7/2004 | Nishimoto et al. | |
| 6,876,127 B2 * | 4/2005 | Mitsuoka et al. .......... | 310/324 |
| 7,240,555 B2 * | 7/2007 | Kawashima ................ | 73/632 |
| 2004/0077213 A1 | 4/2004 | Sakiyama et al. | |
| 2007/0024432 A1 * | 2/2007 | Oda et al. .................. | 340/436 |

FOREIGN PATENT DOCUMENTS

| | | |
|---|---|---|
| JP | A-2000-341795 | 12/2000 |
| JP | A-2001-63497 | 3/2001 |
| JP | A-2001-66359 | 3/2001 |
| JP | A-2002-71789 | 3/2002 |
| JP | A-2003-312232 | 11/2003 |

* cited by examiner

*Primary Examiner*—Hezron Williams
*Assistant Examiner*—Jacques M. Saint-Surin
(74) *Attorney, Agent, or Firm*—Posz Law Group, PLC

(57) ABSTRACT

An ultrasonic sensor assembly includes an ultrasonic sensor apparatus, a holding member and a spring arrangement. The spring arrangement includes two spring portions, which are connected together by a connecting portion. The spring portions are partially secured to a housing of the ultrasonic sensor apparatus and are resiliently deformed between the housing and a rear surface of a bumper. The spring portions and a flange portion of the holding member cooperate together to clamp the bumper therebetween.

9 Claims, 4 Drawing Sheets

ULTRASONIC SENSOR ASSEMBLY

CROSS REFERENCE TO RELATED APPLICATIONS

This application is based on and incorporates herein by reference Japanese Patent Application No. 2004-225829 filed on Aug. 2, 2004. This application is also related to U.S. patent application Ser. No. 11/194,656 filed simultaneously on Aug. 2, 2005 with the present application and entitled "Ultrasonic Sensor Assembly."

BACKGROUND OF THE INVENTION

1. Field of the Invention

The present invention relates to an ultrasonic sensor assembly, which is installed to an installation object, such as a bumper of a vehicle, to sense presence of an obstacle.

2. Description of Related Art

A structure for installing the ultrasonic sensor apparatus, which senses presence of an obstacle, to the bumper of the vehicle is recited in Japanese Unexamined Patent Publication Number 2001-66359.

In Japanese Unexamined Patent Publication Number 2001-66359, a through hole is formed through the bumper (support body), and an ultrasonic sensor apparatus (an ultrasonic sensing device) is received in the through hole from an outer surface side of the bumper in such a manner that one end of the ultrasonic sensor apparatus contacts an peripheral edge of an opening of the through hole on the outer surface of the bumper. One coil spring (a resilient member) is provided to the ultrasonic sensor apparatus in such a manner that a portion of the ultrasonic sensor apparatus is received in the coil spring, and the coil spring is resiliently deformed between the ultrasonic sensor apparatus and the bumper. The bumper is clamped between the coil spring and one end of the ultrasonic sensor apparatus, which contacts the edge of the opening of the through hole on the outer surface of the bumper, to secure the ultrasonic sensor apparatus to the bumper.

However, in the above construction, the ultrasonic sensor apparatus is secured to the bumper by inserting the ultrasonic sensor apparatus in the through hole of the bumper from the outer surface side of the bumper. Thus, the structure of the ultrasonic sensor apparatus is limited by geometrical limitations, such as a size and a shape, of the through hole of the bumper. In other words, there is less freedom in designing of the ultrasonic sensor apparatus.

Furthermore, the bumper is clamped through use of the single coil spring, which is configured to receive the portion of the ultrasonic sensor apparatus. Thus, when one or more of a wall thickness of the bumper, an R (radius) of the bumper, an angle of the bumper relative to the ultrasonic sensor apparatus changes, the bumper cannot be uniformly held by the single coil spring. This causes chattering between the bumper and the ultrasonic sensor apparatus.

The present invention addresses the above disadvantages. Thus, it is an objective of the present invention to provide an ultrasonic sensor assembly, which includes an ultrasonic sensor apparatus and increases design freedom of the ultrasonic sensor apparatus while providing more uniform holding capability for holding an installation object, to which the ultrasonic sensor assembly is installed.

To achieve the objective of the present invention, there is provided an ultrasonic sensor assembly that is installable to a through hole of an installation object, which extends from a first surface to a second surface of the installation object. The ultrasonic sensor assembly includes an ultrasonic sensor apparatus, a holding member and a plurality of spring portions. The ultrasonic sensor apparatus includes a sensor arrangement and a housing. The sensor arrangement is held by the housing and is received in the through hole of the installation object upon installation of the ultrasonic sensor assembly to the installation object. The holding member holds the ultrasonic sensor apparatus relative to the installation object. The holding member includes a flange portion and a holding portion. The flange portion is secured to the first surface of the installation object around a peripheral edge of the through hole of the installation object upon the installation of the holding member to the installation object. The holding portion is connected to the flange portion and extends through the through hole of the installation object upon the installation of the holding member to the installation object, so that the holding portion projects from the second surface of the installation object. The spring portions are partially secured to the housing of the ultrasonic sensor apparatus and are resiliently deformed between the housing and the second surface of the installation object. The spring portions and the flange portion cooperate together to clamp the installation object therebetween.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

An embodiment of the present invention will be described with reference to the accompanying drawings. In the present embodiment, there is described an exemplary case where an ultrasonic sensor apparatus, which is used as a back sonar or a corner sonar, is installed to a bumper of a vehicle (an installation object).

Figure 1:
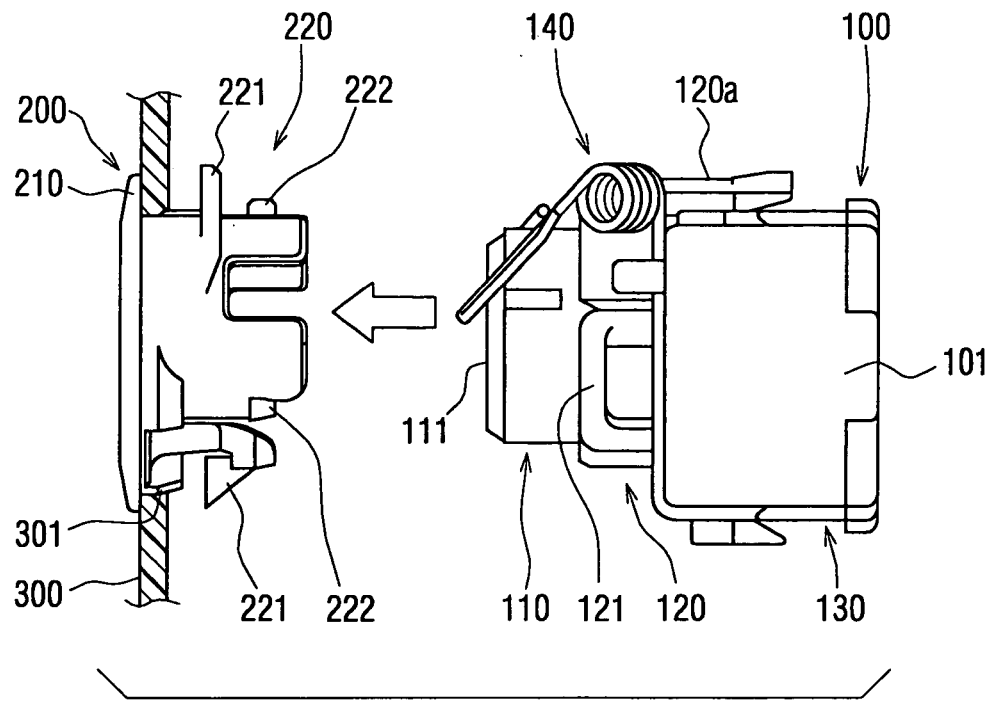
FIG. 1 is a schematic diagram showing an ultrasonic sensor apparatus and a holding member before installation of the ultrasonic sensor apparatus to the holding member according to an embodiment of the present invention.
Figure 2A:
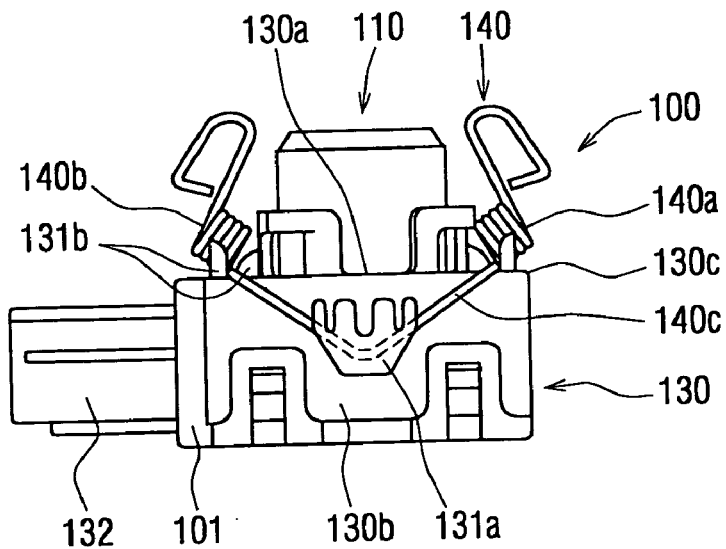
FIG. 2A is a diagram showing a state of a connecting spring arrangement after fixation of the spring arrangement to the ultrasonic sensor apparatus.
Figure 2B:
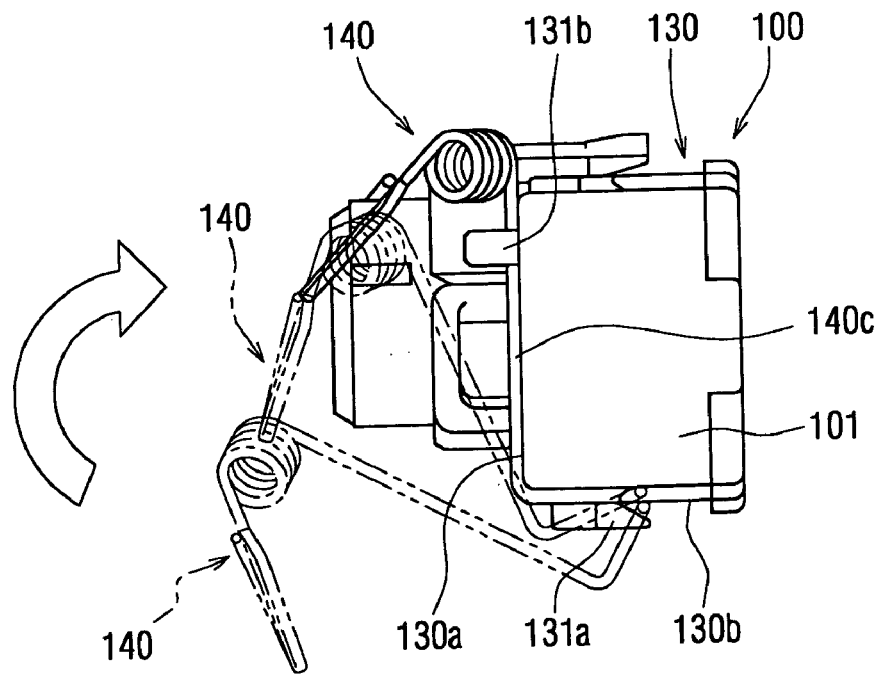
FIG. 2B is a diagram for describing a procedure of the fixation of the spring arrangement to the ultrasonic sensor apparatus.

An ultrasonic sensor assembly, which includes the ultrasonic sensor apparatus and a holding member, will be described with reference to FIGS. 1 and 2 to illustrate an installation structure for installing the ultrasonic sensor apparatus to the bumper. FIG. 1 is a schematic diagram showing the ultrasonic sensor apparatus and the holding member before installation of the ultrasonic sensor apparatus to the holding member. FIG. 2A is a diagram showing a state of a connecting spring arrangement after fixation of the spring arrangement to the ultrasonic sensor apparatus, and FIG. 2B is a diagram for describing a procedure of the fixation of the spring arrangement to the ultrasonic sensor apparatus. In the following description, the characteristic structure of the ultrasonic sensor assembly, which is used to install the same to the bumper, will be mainly described. Known components may be used as other components other than the installation arrangement.

As shown in FIG. 1, the ultrasonic sensor apparatus 100 has a housing 101 made of, for example, polybutylene terephthalate (PBT). The housing 101 receives a piezoelectric vibrator (not shown) and a circuit (not shown), which is connected to the piezoelectric vibrator. The ultrasonic sensor apparatus 100 further includes a sensor arrangement 110, a securing base 120 and a base body 130. The sensor arrangement 110 includes the piezoelectric vibrator. The securing base 120 is engaged with the holding member 200. The base body 130 has the circuit.

The sensor arrangement 110 is formed into a generally cylindrical body, which projects from one surface (axial end surface) 130a of the base body 130. The piezoelectric vibrator is bonded to an inner surface of a distal end wall of the sensor arrangement 110 located on an opposite side of the distal end wall of the sensor arrangement 110, which is opposite from a distal end surface 111 of the sensor arrangement 110. In the sensor arrangement 110, the distal end surface 111, which has a generally circular shape and forms a diaphragm, is vibrated to output ultrasonic waves. The outputted ultrasonic waves are directed toward, for example, an obstacle and are reflected by the obstacle. Then, the reflected ultrasonic waves are received by the piezoelectric vibrator, and the obstacle is sensed based on the received ultrasonic waves. The sensor arrangement 110 is received in a holding part 220 of the holding member 200 upon being received in a through hole 301 of the bumper 300.

The securing base 120 is located radially outward of the sensor arrangement 110 and is coaxial with a sensing axis of the piezoelectric vibrator. Furthermore, the securing base 120 projects in parallel with the sensor arrangement 110 from the one surface 130a of the base body 130, from which the sensor arrangement 110 projects. The holding member 200 is received in the securing base 120. The securing base 120 includes engaging portions (female engaging portions or first side engaging portions) 121, to which engaging portions (male engaging portions or second side engaging portions) 222 described below of the holding member 200 are engaged.

Figure 3A:
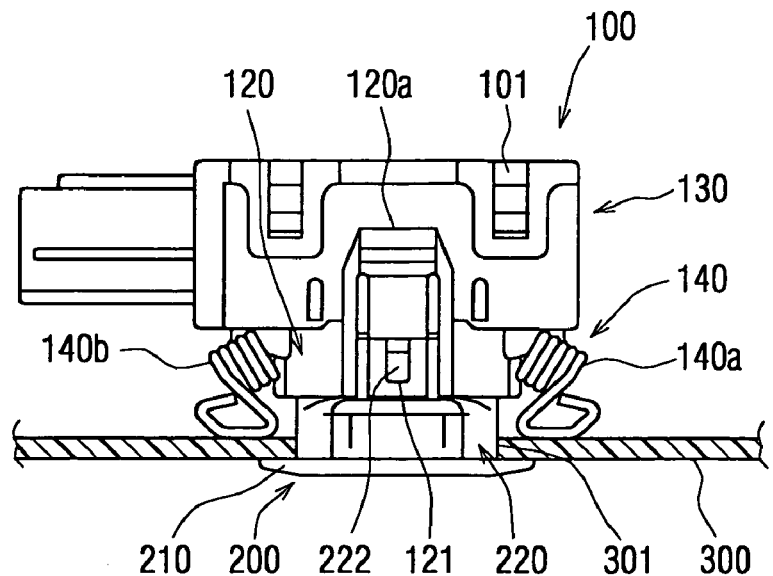
FIG. 3A is a top view showing a structure for installing the ultrasonic sensor apparatus to a bumper.

In the present embodiment, the securing base 120 is made integrally with the housing 101 from the same common material and is divided into multiple segments, which are arranged along an imaginary circle that is coaxial with the sensing axis of the piezoelectric vibrator. Some of the segments of the securing base 120 are formed into an arch-like body, which has two legs that extend axially from the base body 130 and are connected together by a circumferentially extending connection at distal ends thereof, and the engaging portion 121 is formed in the connection to engage with the engaging portion 222 of the holding member 200. The securing base 120 also has a support portion 120a, which forms a lance structure. One of the engaging portions 121 is provided at a distal end of the support portion 120a (FIG. 3A). When a rear end of the support portion 120a is pushed radially inwardly, the distal end of the support portion 120a is pulled radially outwardly by leverage, so that the engagement between the engaging portion 121 of the support portion 120a and the corresponding engaging portion 222 is released. In the base body 130, the circuit, which is connected to the piezoelectric vibrator through lead lines, is received in an interior space defined by the housing 101. The metal connecting spring arrangement 140 is provided to the base body 130 to clamp the bumper 300 in corporation with a flange portion 210 of the holding member 200.

The spring arrangement 140 will be described in greater detail with reference to FIGS. 2A and 2B. FIGS. 2A and 2B are descriptive diagrams for describing the spring arrangement 140. More specifically, FIG. 2A is a diagram showing a state of the spring arrangement 140 after fixation of the spring arrangement 140 to the ultrasonic sensor apparatus 100, and FIG. 2B is a diagram for describing the procedure of the fixation of the spring arrangement 140 to the ultrasonic sensor apparatus 100.

In the present embodiment, the spring arrangement 140 is formed as a double torsion spring and includes two spring portions 140a, 140b, which are spaced from one another and are connected together by a connecting portion 140c. The spring portions 140a, 140b serve as spring portions, each of which is spirally wound, of the present invention.

An adjacent surface (peripheral surface) 130b of the base body 130, which is adjacent to the one surface 130a, includes an engaging protrusion 131a. A generally central point of the connecting portion 140c of the spring arrangement 140 is engaged with the engaging protrusion 131a. Two positioning portions 131b are provided in the one surface 130a of the base body 130. The two positioning portions 131b position a part of a first side section and a part of a second side section, respectively, of the connecting portion 140c. Here, the first side section of the connecting portion 140c is located between one of the two spring portions 140a, 140b and the generally central point of the connecting portion 140c, which is engaged with the engaging protrusion 131a. The second side section of the connecting portion 140c is located between the other one of the two spring portions 140a, 140b and the generally central point of the connecting portion 140c. Furthermore, the connecting portion 140c is bent at a boundary between the one surface 130a and the adjacent surface 130b of the base body 130, so that the connecting portion 140c extends along the one surface 130a and the adjacent surface 130b of the base body 130 when the spring arrangement 140 is fixed to the base body 130. Also, a portion of the connecting portion 140c, which is located between the generally central point of the connecting portion 140c and the boundary between the one surface 130a and the adjacent surface 130b, is bent to have a generally V-shape.

Thus, as shown in FIG. 2B, in the state where the generally central point of the connecting portion 140c is engaged with the engaging protrusion 131a, when the spring arrangement 140 is pivoted about the engaging protrusion 131a in a direction of a blank arrow, the connecting portion 140c can be positioned to the positioning portions 131b. As discussed above, the spring arrangement 140 can be easily fixed to the base body 130. In FIG. 2B, the spring arrangement 140 is pivoted in the fixation process is indicated with dot-dot-dash lines. Furthermore, the engaging protrusion 131a and the positioning portions 131b are provided in the adjacent surfaces 130a, 130b of the base body 130. The one surface 130a, the adjacent surface 130b and the engaging protrusion 131a of the base body 130 limit three dimensional movement of the connecting portion 140c. Thus, with use of the structure of the present embodiment, the spring arrangement 140 can be securely fixed to the ultrasonic sensor apparatus 100.

Furthermore, when the portion of the connecting portion 140c, which is located at the spring portion 140a, is released from the positioning portion 131b and is moved outwardly away from a corresponding corner 130c of the base body 130, the connecting portion 140c is disengaged from the engaging protrusion 131a and the other positioning portion 131b to allow uninstallation of the spring arrangement 140 from the base body 130. As discussed above, the spring arrangement 140 can be easily uninstalled from the base body 130. Alternatively, the portion of the connecting portion 140c, which is located at the spring portion 140b, may be moved away from the positioning portion 131b to remove the spring arrangement 140 from the base body 130.

As discussed above, the spring arrangement 140 of the present embodiment is removably installed to the base body 130 (housing 101) of the ultrasonic sensor apparatus 100. In FIG. 2A, numeral 132 indicates a connector portion, which forms external output terminals.

As shown in FIG. 1, the holding member 200 includes the flange portion 210 and a cylindrical holding portion 220. The flange portion 210 engages a peripheral edge of the through hole 301 on the front surface (outer surface or first surface) of the bumper 300. The holding portion 220 is connected to the flange portion 210 and extends through the through hole 301 to protrude from the rear surface (inner surface or second surface) of the bumper 300. In the present embodiment, similar to the housing 101 of the ultrasonic sensor apparatus 100, the holding member 200 is made of the PBT. Also, the bumper 300 is made of a synthetic resin material.

The tubular section of the holding part 220 receives a portion of the sensor arrangement 110 of the ultrasonic sensor apparatus 100, and a portion of the holding part 220 is received in the securing base 120 of the ultrasonic sensor apparatus 100. Furthermore, a temporarily securing claw 221 and the engaging portions 222 are provided in the holding portion 220.

The temporarily securing claw 221 is configured to as follows. That is, a space between the temporarily securing claw 221 and the flange portion 210 is longer than the thickness of the bumper 300 in the fore-and-aft direction of the vehicle, and a projection apex of the temporarily securing claw 221, which projects downwardly in FIG. 1, is positioned adjacent to a peripheral edge of the opening of the through hole 301 of the bumper 300 on the rear surface side of the bumper 300. With the above construction, the holding portion 220 can be easily inserted through the through hole 301, and the holding member 200 can be held by the bumper 300 until the time for securing the ultrasonic sensor apparatus 100 to the holding member 200.

The engaging portions 222 project from the holding portion 220 and are arranged to correspond with the engaging portions 121 of the securing base 120 of the ultrasonic sensor apparatus 100.

Then, in a state where the holding member 200 is temporarily secured to the bumper 300, the ultrasonic sensor apparatus 100 is moved in a direction of a blank arrow to insert the sensor arrangement 110 into the holding portion 220. In this way, the ultrasonic sensor apparatus 100 is installed to the bumper 300.

Figure 3B:
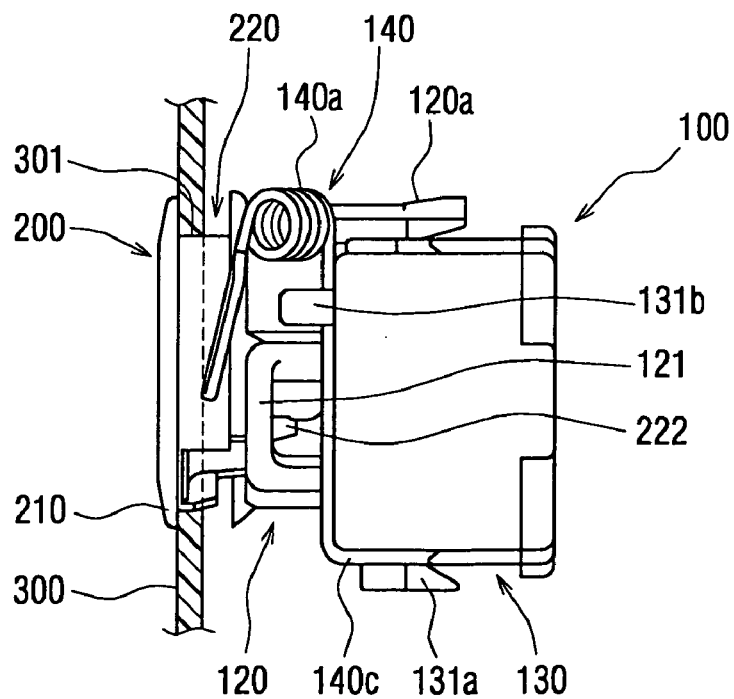
FIG. 3B is a right side view of the structure shown in FIG. 3A.

Next, the structure for installing the ultrasonic sensor apparatus 100 to the bumper 300 will be described with reference to FIGS. 3A and 3B. FIGS. 3A and 3B are diagrams for describing the structure for installing the ultrasonic sensor apparatus 100. More specifically, FIG. 3A is a top view showing the structure for installing the ultrasonic sensor apparatus 100, and FIG. 3B is a right side view of the structure shown in FIG. 3A. In FIGS. 3A and 3B, only the bumper 300 is indicated in the cross sectional view. In FIG. 3B, a portion of the bumper 300 is indicated in the cross sectional view to show the engaged state of the connecting spring arrangement 140.

The sensor arrangement 110 of the ultrasonic sensor apparatus 100 shown in FIG. 1 is inserted into the holding portion 220 in such a manner that the distal end surface 111 of the sensor arrangement 110 and the outer surface of the holding member 200 are generally positioned in a common imaginary plane. In this state, as shown in FIGS. 3A and 3B, the engaging portions 222 of the holding portion 220 are engaged with the engaging portions 121 of the securing base 120 of the ultrasonic sensor apparatus 100. In the spring arrangement 140, which has the connecting portion 140c secured to the base body 130 of the ultrasonic sensor arrangement 100, the opposite ends of the connecting portion 140c, which are opposite from the portion of the connecting portion 140c secured to the base body 130 with respect to the spring portions 140a, 140b, are engaged with the rear surface of the bumper 300 to clamp the bumper 300 incorporation with the flange portion 210 engaged with the edge of the opening of the through hole 301 of the bumper 300. That is, upon the engagement of the engaging portions 222 of the holding member 200 with the engaging portions 121 of the ultrasonic sensor apparatus 100, the ultrasonic sensor apparatus 100 is secured to the holding member 200, which is temporarily secured to the bumper 300. Thus, the ultrasonic sensor apparatus 100 and the holding member 200 are secured to the bumper 300, and the bumper 300 is clamped between the flange portion 210 of the holding member 200 and the spring arrangement 140.

In the present embodiment, the holding member 200, which holds the ultrasonic sensor apparatus 100, is provided to the bumper 300. The sensor arrangement 110 of the ultrasonic sensor apparatus 100 is inserted into the through hole 301 from the rear surface side of the bumper 300. Thus, it is not required to insert and secure the ultrasonic sensor apparatus 100 into the through hole 301 of the bumper 300 from the front surface side of the bumper 300. Therefore, the outer diameter of the securing base 120 and the outer diameter of the base body 130 can be made larger than the inner diameter of the through hole 301 of the bumper 300. In other words, the design freedom of the ultrasonic sensor apparatus 100 can be improved.

Figure 4:
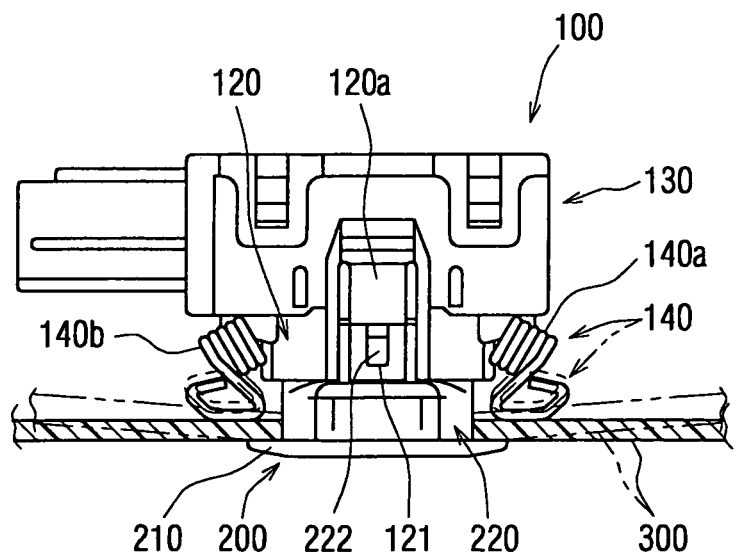
FIG. 4 is a diagram for describing a characteristic feature of the embodiment.

Furthermore, in the present embodiment, there are provided the two spring portions 140a, 140b, which are partially secured to the housing 101 of the ultrasonic sensor apparatus 100 and are resiliently deformed between the housing 101 and the rear surface of the bumper 300. Thus, as shown in FIG. 4, even when the thickness of the bumper 300, the R (radius) of the bumper 300 and the angle of the bumper 300 relative to the sensor arrangement 110 of the ultrasonic sensor apparatus 100 change due to the displacement or deformation of the bumper 300 caused by, for example, the creep of the resin of the bumper 300, the spring portions 140a, 140b can be resiliently deformed in conformity with the displacement or the deformation of the bumper 300. Thus, the spring portions 140a, 140b can hold the bumper 300 with the moderate holding force. Thus, the structure for installing the ultrasonic sensor apparatus 100 of the present embodiment can uniformly hold the bumper 300 to stably secure the ultrasonic sensor apparatus 100 to the bumper 300. FIG. 4 is a diagram for describing the characteristic feature of the present embodiment. The bumper 300 and the spring arrangement 140, which are depicted with a dot-dot-dash line, show the state after the deformation of the bumper 300.

Furthermore, in the present embodiment, the two spring portions 140a, 140b are connected together by the connecting portion 140c to provide the integral spring arrangement 10 (the double torsion spring). Thus, the number of steps for installing the multiple spring portions 140a, 140b to the ultrasonic sensor apparatus 100 can be reduced.

The preferred embodiment of the present invention has been described. However, the present invention is not limited to the above-described embodiment, and the above embodiment can be modified in various ways.

In the present embodiment, the two spring portions 140a, 140b are provided to clamp the bumper 300 in corporation with the flange portion 210 of the holding member 200. However, the number of the spring portions, which are provided to the ultrasonic sensor apparatus 100, is not limited to two. In other words, as long as the multiple spring portions are provided, the number of the spring portions can be changed to any suitable number. Furthermore, in the above example, the two spring portions 140a, 140b are integrated together through the connecting portion 140c and are provided to the ultrasonic sensor apparatus 100 as the spring arrangement 140. However, the two springs 140a, 140b can be independently installed to the ultrasonic sensor apparatus 100. At that time, for example, in the case where the two springs 140a, 140b are made as coil springs and are coaxially arranged (e.g., placing the spring 140b inside the spring 140a), the effect of the coil springs 140a, 140b against the displacement or the deformation of the bumper 300 is reduced. Thus, in order to uniformly hold the bumper 300, it is advantageous to spread the multiple springs 140a, 140b in the manner discussed in the present embodiment. Also, the number of the springs of the spring arrangement 140 is not limited to two.

Furthermore, in the present embodiment, the engaging portions 222 are provided in the holding portion 220 of the holding member 200, and the engaging portions 121 are provided in the securing base 120 of the ultrasonic sensor apparatus 100. Through the engagement between the engaging portions 222 and the engaging portions 121, the ultrasonic sensor apparatus 100 is secured to the holding member 200, which is temporarily secured to the bumper 300. However, the way of securing the ultrasonic sensor apparatus 100 to the holding member 200 is not limited to the above example. Besides the above described one, the ultrasonic apparatus 100 can be secured to the holding member 200 by any other know technique, such as, fitting, screwing, welding, fusing, bonding. Furthermore, the engaging portions (female engaging portions) 121 may be provided in the holding portion 220 of the holding member 200, and he engaging portions (male engaging portions) 222 may be provided in the sensor arrangement 110 or the securing base 120 of the ultrasonic sensor apparatus 100.

Furthermore, in the present embodiment, the sensor arrangement 110 and the base body 130 are separately provided as the components of the ultrasonic sensor apparatus 100. However, the base body 130 may be provided as a part of the sensor arrangement 110.

Figure 5A:
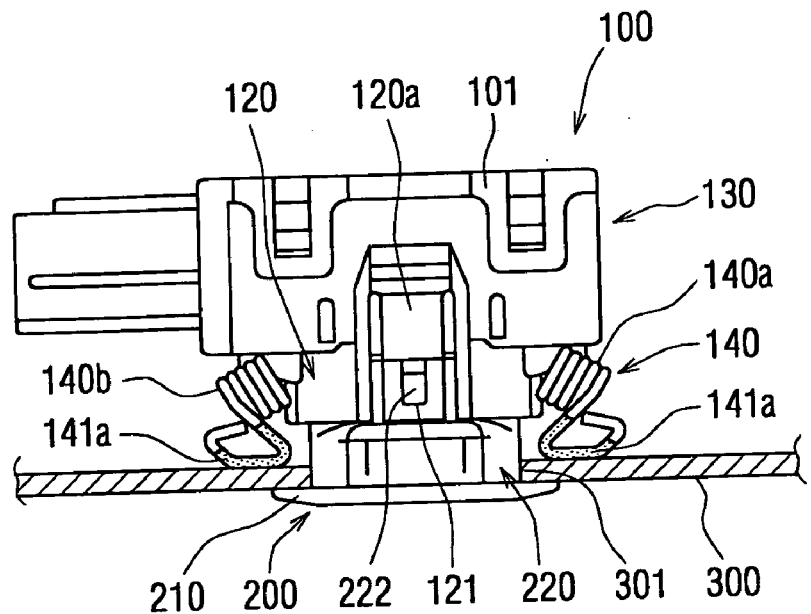
FIG. 5A is a diagram showing a case where a dielectric material covers the spring arrangement.
Figure 5B:
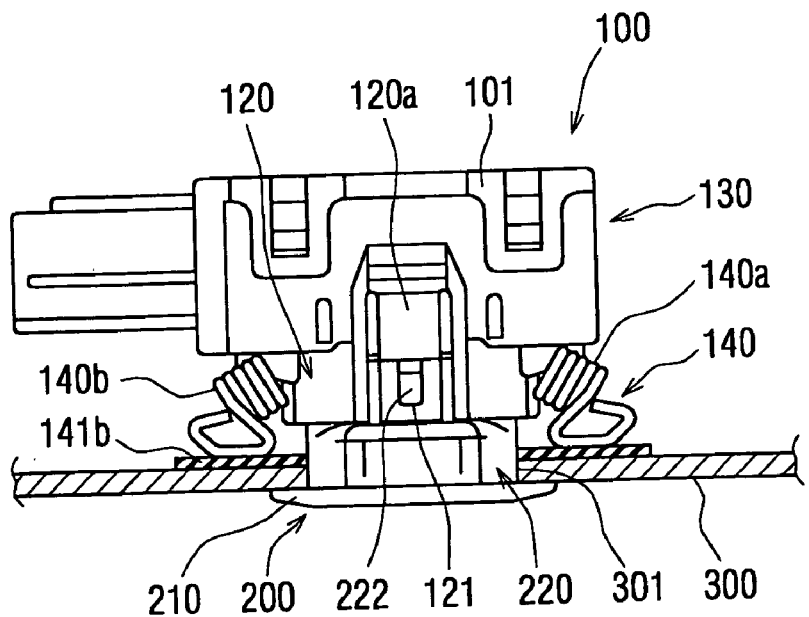
FIG. 5B is a diagram showing a case where a dielectric material is secured to the bumper.

In the present embodiment, the bumper 300 is made from the resin material. However, in a case where the bumper 300 is made of a metal material, and the spring arrangement 140, which contacts the bumper 300, is made of a metal material that is different from the metal material of the bumper 300, galvanic corrosion (corrosion caused by an electrical potential difference) occurs. Thus, in such a case, it is desirable to interpose a dielectric material between the bumper 300 and the spring arrangement 140. For example, as shown in FIG. 5A, each engaging part of the spring arrangement 140, which engages the bumper 300, may be covered or coated with the dielectric material 141a. Also, as shown in FIG. 5B, a dielectric body (dielectric material) 141b may be interposed between the spring arrangement 140 and the bumper 300 by, for example, bonding the dielectric body 141b to the bumper 300. In such a case, the dielectric material is preferably a material that is elastically deformable to follow the displacement or the deformation of the bumper 300. FIGS. 5A and 5B show the modifications of the above embodiment. More specifically, FIG. 5A shows the case where the dielectric material 141a covers the spring arrangement 140, and FIG. 5B shows the case where the dielectric body 141b is secured to the bumper 300.

In the above embodiment, the ultrasonic sensor apparatus 100 is installed to the bumper (installation object) 300 of the vehicle through the holding member 200. However, the installation object is not limited to the bumper 300 and can be replaced with any other appropriate one.

Additional advantages and modifications will readily occur to those skilled in the art. The invention in its broader terms is therefore not limited to the specific details, representative apparatus, and illustrative examples shown and described.

What is claimed is:

1. An ultrasonic sensor assembly that is installable to a through hole of an installation object, which extends from a first surface to a second surface of the installation object, the ultrasonic sensor assembly comprising:
   an ultrasonic sensor apparatus that includes a sensor arrangement and a housing, wherein the sensor arrangement is held by the housing and is received in the through hole of the installation object upon installation of the ultrasonic sensor assembly to the installation object;
   a holding member that holds the ultrasonic sensor apparatus relative to the installation object, wherein the holding member includes:
      a flange portion, which is secured to the first surface of the installation object around a peripheral edge of the through hole of the installation object upon the installation of the holding member to the installation object;
      a holding portion, which is connected to the flange portion and extends through the through hole of the installation object upon the installation of the holding member to the installation object, so that the holding portion projects from the second surface of the installation object; and
   a plurality of spring portions, which are partially secured to the housing of the ultrasonic sensor apparatus and are resiliently deformed between the housing and the second surface of the installation object, wherein the spring portions and the flange portion cooperate together to clamp the installation object therebetween.

2. The ultrasonic sensor assembly according to claim 1, wherein the plurality of spring portions includes two spring portions, which are connected to each other through a connecting portion to form a double torsion spring.

3. The ultrasonic sensor assembly according to claim 2, wherein:
   the housing of the ultrasonic sensor apparatus includes:
      an engaging protrusion, to which a generally central point of the connecting portion is engaged; and two positioning portions, which position a part of a first side section and a part of a second side section, respectively, of the connecting portion;

the first side section of the connecting portion is located between one of the two spring portions and the generally central point of the connecting portion;

the second side section of the connecting portion is located between the other one of the two spring portions and the generally central point of the connecting portion; and the double torsion spring is detachably installed to the housing.

4. The ultrasonic sensor assembly according to claim 3, wherein:

the two positioning portions are provided in one of two adjacent surfaces of the housing; and the engaging protrusion is provided in the other one of the two adjacent surfaces of the housing.

5. The ultrasonic sensor assembly according to claim 1, wherein:

the installation object is made of a metal material; and each spring portion is engaged with the installation object through a dielectric material.

6. The ultrasonic sensor assembly according to claim 5, wherein an engaging part of each spring portion, which is engaged with the installation object, is covered with the dielectric material.

7. The ultrasonic sensor assembly according to claim 5, wherein the dielectric material is interposed between the spring portion and the installation object.

8. The ultrasonic sensor assembly according to claim 1, wherein the installation object is a bumper of a vehicle.

9. The ultrasonic sensor assembly according to claim 1, wherein each spring portion is spirally wound.

* * * * *